Jan. 8, 1929.  H. HUBBELL  1,698,231
MEANS FOR ALIGNING ELECTRICAL FIXTURES WITH FACEPLATES
Filed Jan. 3, 1927
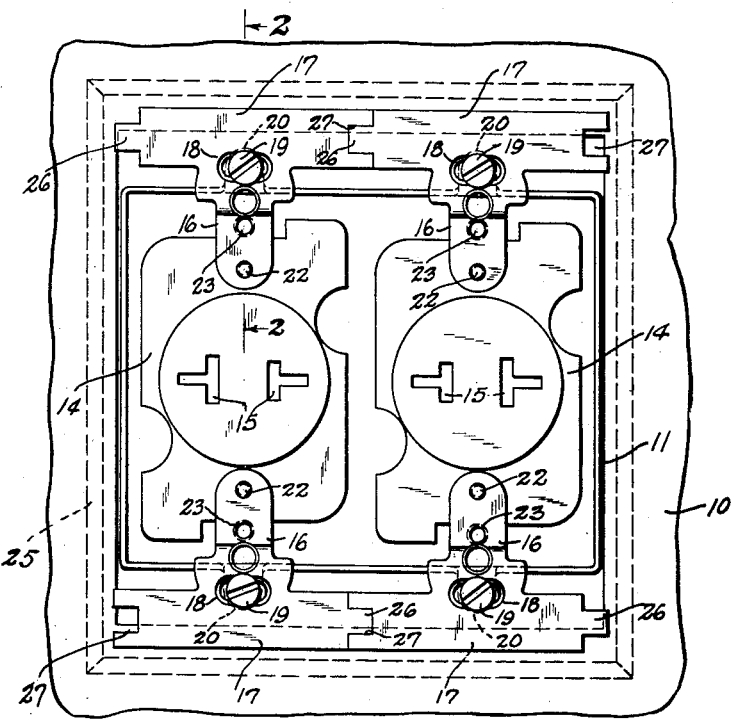
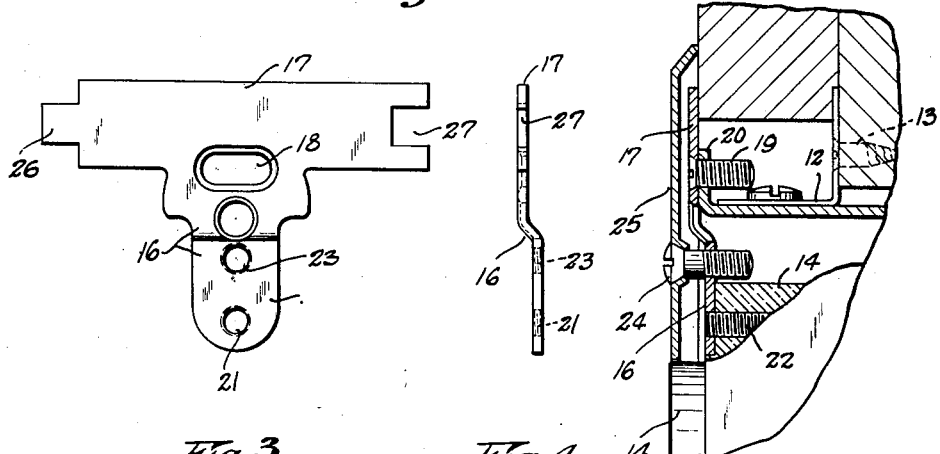
INVENTOR.
Harvey Hubbell
BY Wooster & Davis
ATTORNEYS.

Patented Jan. 8, 1929.

1,698,231

UNITED STATES PATENT OFFICE.

HARVEY HUBBELL, OF BRIDGEPORT, CONNECTICUT; LOUIE E. HUBBELL EXECUTRIX OF SAID HARVEY HUBBELL, DECEASED.

MEANS FOR ALIGNING ELECTRICAL FIXTURES WITH FACEPLATES.

Application filed January 3, 1927. Serial No. 158,520.

This invention relates to mountings for electrical fixtures and especially to the means for mounting these fixtures in wall outlet boxes, and has for an object to provide a mounting for these fixtures whereby a plurality of fixtures in a single outlet box may be properly aligned and positioned relative to each other and to the face plate.

With the foregoing and other objects in view, I have devised the device illustrated in the accompanying drawing forming a part of this specification. In this drawing, Fig. 1 is a front elevation of a two gang installation showing two receptacles mounted in a wall outlet box, and with the face plate removed but indicated in dotted lines.

Fig. 2 is a vertical section through the upper part of the installation substantially on line 2—2 of Fig. 1.

Fig. 3 is a plan view of the fixture support, and

Fig. 4 is a side elevation thereof.

Referring to the drawings, a wall is indicated at 10 in which is mounted the usual wall outlet box 11, in the present instance secured by brackets 12 and suitable screws 13 to the wall structure. In the layout illustrated the box is a two gang box, that is, it is adapted to hold two electrical fixtures, and the specific fixtures illustrated are receptaces 14 having suitable slots 15 in their front walls for passage of the contact blades of the standard attachment plug cap in the usual manner. I wish it to be distinctly understood, however, that these receptacles are used merely for illustration, as the mounting is equally adapted for switches and the like. They are further adapted for use in any size of installation whether there are two or more fixtures.

The mounting for the fixtures is shown separate in Figs. 3 and 4 and there are two of them used for each fixture, one for the upper and one for the lower end, although if preferred they may be made in one piece extending across the fixture. As shown they are roughly T-shape with a body 16 and a cross bar 17. The body has an elongated slot 18 for a screw 19 threaded into the ear 20 on the outlet box for securing these supports to the box, and the body has a threaded opening 21 for a securing screw 22 in the body of the fixture whereby the fixture is secured to this support. The body also has a threaded opening 23 for the securing screw 24 passing through the cover or face plate 25.

At one end of the cross bar 17 is a lug 26 and on the other end a similar shaped notch 27, and as shown in Fig. 1, when the supports are mounted on the outlet box the lug 26 on one support fits in the notch 27 on the next adjacent support, and therefore, interlocks therewith to hold the two supports together in a given relative position. Thus after one fixture is properly positioned the next one is placed in position with the notch and tongue interengaged and this automatically places the second fixture in proper position and the adjacent fixtures at the proper distances apart. It will thus be apparent that adjacent supports are always held in the same relative position, and therefore, the electrical fixtures carried by these supports are also mounted and held in the proper relative position. The cover or face plate 25 is made in one piece, as indicated in dotted lines in Fig. 1. If there are more than two fixtures the face or cover plate will be made of corresponding width.

It will be apparent from the foregoing description that this support for the fixture may be used for one or any number of fixtures as desired, and that where there are more than one fixture they are all automatically placed at the proper distance apart when they are mounted in position in the box to give the proper spacing between the fixtures, and also to properly locate the openings 23 for the face plate securing screws to bring them into alignment with the openings for these screws in the face plate, and will, therefore, facilitate the assembly of the face plate to the fixtures.

Having thus set forth the nature of my invention, what I claim is:

1. In combination a wall outlet box, an electrical fixture, and means for mounting the fixture in the box including a supporting member, means for securing the member to the box permitting adjustment of said member with respect to the box, means for securing the fixture to the supporting member, and means on the member for cooperation with a similar member for supporting an adjacent fixture to align said members and position them in proper spaced relation.

2. In combination a wall outlet box, a plurality of electrical fixtures, supports for each fixture having interlocking connection with the support for the adjacent fixture to align and position them in proper spaced relation, means for securing the supports to the box permitting adjustment of said supports with respect to the box, and means for securing the fixtures to the supports.

3. In a mounting for electrical fixtures, a supporting member having a body portion provided with an elongated opening to receive a securing screw to adjustably secure it to a wall outlet box and also provided with means to cooperate with a fixture securing means, said member also having a cross portion provided at its opposite ends with means for interlocking connection with the adjacent ends of similar members to align said members and position them in proper spaced relation.

4. In a mounting for electrical fixtures, a supporting member having a body portion provided with means whereby it may be adjustably secured to a wall outlet box and having a cross portion provided at one end with a recess and at the opposite end with a lug adapted for interengaging connection with the recess of a similar member supporting an adjacent fixture to retain the members in proper alignment and in proper spaced relation.

5. In combination a wall outlet box, a pair of electrical fixtures mounted side by side in said box, supports for said fixtures having body portions to which the fixtures are secured and also having cross portions provided at their adjacent edges with interlocking connections to retain the supports in proper alignment and in proper spaced relation, and means for securing said supports to the outlet box for transverse adjustment with respect thereto.

6. In a mounting for electrical fixtures, a substantially T-shaped supporting member having an elongated opening for passage of a mounting screw and openings for securing screws for the fixture and a face plate, and the cross arm being provided with means at each end adapted for interlocking connection with the complementary means of a similar support for an adjacent fixture to retain said supports in proper alignment and openings for the securing screws in proper spaced relation.

7. In a mounting for electrical fixtures, a substantially T-shaped supporting member having an elongated opening for passage of a mounting screw and openings for securing screws for the fixture and a face plate, and the cross arm being provided at one end with a recess and at the other end with a lug each of which is adapted for interlocking connection with the complementary element of a similar support for an adjacent fixture to retain said supports in proper alignment and the openings for the securing screws in proper spaced relation.

In testimony whereof I affix my signature.

HARVEY HUBBELL.